(12) United States Patent
Gregoire

(10) Patent No.: US 7,719,694 B1
(45) Date of Patent: May 18, 2010

(54) SYSTEM AND METHOD OF SURFACE WAVE IMAGING TO DETECT ICE ON A SURFACE OR DAMAGE TO A SURFACE

(75) Inventor: Daniel J. Gregoire, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 64 days.

(21) Appl. No.: 12/144,073

(22) Filed: Jun. 23, 2008

(51) Int. Cl.
*G01B 11/30* (2006.01)

(52) U.S. Cl. .................. 356/601; 356/600; 356/611

(58) Field of Classification Search .......... 356/600–640
See application file for complete search history.

(56) References Cited

U.S. PATENT DOCUMENTS

| | | | |
|---|---|---|---|
| 3,634,753 A * | 1/1972 | Unterberger | 324/337 |
| 3,665,466 A * | 5/1972 | Hibbard | 342/59 |
| 3,891,979 A * | 6/1975 | Braun et al. | 340/581 |
| 4,892,906 A | 1/1990 | Pham et al. | |
| 5,650,461 A | 7/1997 | Wasserman et al. | |
| 5,695,155 A * | 12/1997 | MacDonald et al. | 244/134 F |
| 6,531,537 B2 | 3/2003 | Friel et al. | |
| 2004/0042077 A1 | 3/2004 | Birge et al. | |
| 2004/0164682 A1 | 8/2004 | Hopwood et al. | |
| 2004/0175407 A1 | 9/2004 | McDaniel | |
| 2004/0224145 A1 | 11/2004 | Weir et al. | |
| 2004/0256056 A1 | 12/2004 | Hall et al. | |
| 2005/0058689 A1 | 3/2005 | McDaniel | |
| 2005/0126441 A1 | 6/2005 | Skelhorn | |
| 2006/0141003 A1 | 6/2006 | McDaniel | |

OTHER PUBLICATIONS

Daniels, "On the Ionization of Air for Removal of Noxious Effluvia (Air Ionization of Indoor Environments for Control of Volatile and Particulate Contaminants with Nonthermal Plasmas Generated by Dielectric-Barrier Discharge," IEEE Transactions on Plasma Science, vol. 30, No. 4, Aug. 2002, pp. 1471-1481.
Deng, et al., "Physical Mechanisms of Inactivation of *Bacillus subtilis* Spores Using Cold Atmospheric Plasmas," IEEE Transactions on Plasma Science, vol. 34, No. 4, Aug. 2006, pp. 1310-1316.
Herrmann, et al., "Chemical Warfare Agent Decontamination Studies in the Plasma Decon Chamber," IEEE Transactions on Plasma Science, vol. 30, No. 4, Aug. 2002, pp. 1460-1470.
Laroussi, "Nonthermal Decontamination of Biological Media by Atmospheric-Pressure Plasmas: Review, Analysis, and Prospects," IEEE Transactions on Plasma Science, vol. 30, No. 4, Aug. 2002, pp. 1409-1415.
Montie, et al., "An Overview of Research Using the One Atmosphere Uniform Glow Discharge Plasma (OAUGDP) for Sterilization of Surfaces and Materials," IEEE Transactions on Plasma Science, vol. 28, No. 1, Feb. 2000, pp. 41-50.

* cited by examiner

*Primary Examiner*—Gregory J Toatley, Jr.
*Assistant Examiner*—Jarreas C. Underwood
(74) *Attorney, Agent, or Firm*—Christie, Parker, Hale

(57) ABSTRACT

A system and a method are provided for detecting a surface characteristic of a surface. A plurality of transponders are located on the surface for transmitting electromagnetic surface waves and for receiving the electromagnetic surface waves upon being reflected, diffracted, refracted, scattered, or otherwise altered by ice on the surface. A controller is coupled to the plurality of transponders. The controller is adapted to coordinate the plurality of transponders for imaging the surface characteristic of the surface.

21 Claims, 8 Drawing Sheets

SYSTEM AND METHOD OF SURFACE WAVE IMAGING TO DETECT ICE ON A SURFACE OR DAMAGE TO A SURFACE

CROSS-REFERENCE TO RELATED APPLICATION(S)

This application is related to the following patent applications, all of which are incorporated herein by reference: H611:60258 entitled "System and Method of Surface Wave Imaging to Map Pressure on a Surface"; H611:60449 entitled "System and Method of Surface Wave Imaging to Detect Damage to a Surface"; H611:60259 entitled "Method for Surface Decontamination Using Electromagnetic Surface Waves"; H611:60592 entitled "Method for De-icing Using Electromagnetic Surface Waves"; and H611:60447 entitled "System and Method for Large Scale Atmospheric Plasma Generation." This application is also related to U.S. Pat. No. 7,307,589 entitled "Large-Scale Adaptive Surface Sensor Arrays," which is incorporated herein by reference.

BACKGROUND OF THE INVENTION

1. Field of the Invention

The present invention relates to electromagnetic surface waves, and in particular, to a system and a method of surface wave imaging to detect ice on a surface or damage to a surface.

2. Description of Related Art

Typical prior art ice detectors are optical probes, such as a device of Lawrence Livermore National Laboratory that uses an optical technique to measure ice thickness (in millimeters, for example) on airplane wings and transmits the measurements to the pilot. One design concept produces a measurement range of 15 mm of ice thickness with a resolution of 15 um. Other ranges can be easily accommodated. The device mounts flush with the airfoil without any protrusions, making it suitable for supersonic flight applications.

Optical ice detectors can be installed on any type of air vehicle with enough air speed to keep water from accumulating on the optics. Optical ice detectors are installed with the probe to be mounted in the air stream beyond the boundary layer, and in a location easily accessible to the pilot for occasional cleaning with a cotton swab and isopropyl alcohol. Such prior art ice detectors detect ice in specific predetermined and noncontinuous locations, but do not provide a map of ice formation over an entire surface.

Therefore, a need exists for a system and a method of ice detection that is not hindered by water accumulation, and further, for a system and a method of imaging ice for providing a map of ice formation over an entire surface.

For systems that are not an integral part of the platform under test, systems such as x-ray diagnostics can be used to detect damage on large structures, but the x-ray diagnostics must be operated in a service bay by trained personnel. With respect to integrated systems, many integrated vehicular health management systems use sensors and intelligent prognostication software to identify crisis situations such as damage to a vehicle. Typically, the more sensors available, the more likely a compromising situation can be averted. However, such systems do not identify precise locations of a structural compromise.

Therefore, a need exists for a system and a method of detecting damage on a surface, and further, to image damage to a surface that provides information not only on a structural compromise, but also on an exact location of a structural compromise.

SUMMARY OF THE INVENTION

In an exemplary embodiment of the present invention, a method of detecting a surface characteristic of a surface configured to propagate surface waves is provided. Electromagnetic surface waves are transmitted onto the surface. The electromagnetic surface waves are received upon being reflected, diffracted, refracted, scattered, or otherwise altered by the surface characteristic of the surface. The transmitting and the receiving of the electromagnetic surfaces waves are coordinated for imaging the surface characteristic of the surface.

In one embodiment, the electromagnetic surface waves are transmitted from a plurality of transmitters located at a perimeter of the surface and receiving the electromagnetic surface waves by the plurality of transmitters.

In one embodiment, the plurality of transmitters are coordinated to transmit and to receive the electromagnetic surface waves for imaging the surface characteristic of the surface.

In one embodiment, a surface-wave medium is laminated to the surface and the surface-wave medium includes a dielectric.

In one embodiment, the surface-wave medium includes a conductive ground plane between the surface and the dielectric.

In one embodiment, the surface-wave medium includes a metallic pattern on the dielectric for increasing an inductive reactance of the surface-wave medium.

In one embodiment, the metallic pattern is aperiodic.

In one embodiment, the metallic pattern is a periodic metallic pattern of squares, rectangles, parallel or perpendicular hash marks, or Jerusalem crosses.

In one embodiment, the surface characteristic is ice and the method further includes analyzing the received electromagnetic surface waves and comparing the received electromagnetic surface waves to baseline signals from an ice-free surface for imaging the ice on the surface.

In one embodiment, the surface characteristic is damage and the method further includes analyzing the received electromagnetic surface waves and comparing the received electromagnetic surface waves to baseline signals from a damage-free surface for imaging the damage to the surface.

In an exemplary embodiment of the present invention, a method of forming a surface characteristic detection system on a surface is provided. A plurality of transponders are located on the surface for transmitting electromagnetic surface waves and for receiving the electromagnetic surface waves upon being reflected, diffracted, refracted, scattered, or otherwise altered by the surface characteristic of the surface. The plurality of transponders are coupled to a controller. The controller is adapted to coordinate the plurality of transponders for imaging the surface characteristic of the surface.

In one embodiment, the plurality of transponders are located at a perimeter of the surface.

In one embodiment, a surface-wave medium is laminated to the surface. The surface-wave medium includes a dielectric.

In one embodiment, the surface-wave medium includes a conductive ground plane between the surface and the dielectric.

In one embodiment, the surface-wave medium includes a metallic pattern on the dielectric for increasing an inductive reactance of the surface-wave medium.

In one embodiment, the surface characteristic is one selected from the group consisting of ice on the surface or damage to the surface.

In an exemplary embodiment of the present invention, a method of forming a surface characteristic detection system on a surface including laminating a surface-wave medium to the surface, the surface-wave medium including a conductive ground plane, a dielectric on the ground plane, and a metallic pattern on the dielectric for increasing an inductive reactance of the surface-wave medium; locating a plurality of transponders at a perimeter of the surface for transmitting electromagnetic surface waves and for receiving the electromagnetic surface waves upon being reflected, diffracted, refracted, scattered, or otherwise altered by ice on the surface; and coupling the plurality of transponders to a controller, the controller being adapted to coordinate the plurality of transponders for imaging the surface characteristic of the surface, the surface characteristic being one selected from the group consisting of ice on the surface or damage to the surface.

In an exemplary embodiment of the present invention, a system for detecting a surface characteristic of a surface is provided. The system includes a plurality of transponders on the surface for transmitting electromagnetic surface waves and for receiving the electromagnetic surface waves upon being reflected, diffracted, refracted, scattered, or otherwise altered by the surface characteristic of the surface; and a controller coupled to the plurality of transponders, the controller being adapted to coordinate the plurality of transponders for imaging the surface characteristic of the surface.

In an exemplary embodiment of the present invention, a system for detecting ice on a surface or damage to the surface is provided including a surface-wave medium laminated to the surface, the surface-wave medium including a conductive ground plane, a dielectric on the ground plane, and a metallic pattern on the dielectric for increasing an inductive reactance of the surface-wave medium; a plurality of transponders located at a perimeter of the surface for transmitting electromagnetic surface waves and for receiving the electromagnetic surface waves upon being reflected, diffracted, refracted, scattered, or otherwise altered by ice on the surface; and a controller coupled to the plurality of transponders, the controller being adapted to coordinate the plurality of transponders, to analyze the received electromagnetic surface waves, and to compare the received electromagnetic surface waves to baseline signals from an ice-free surface for imaging the ice on the surface or from a damage-free surface for imaging the damage to the surface.

DETAILED DESCRIPTION

Figure 1:
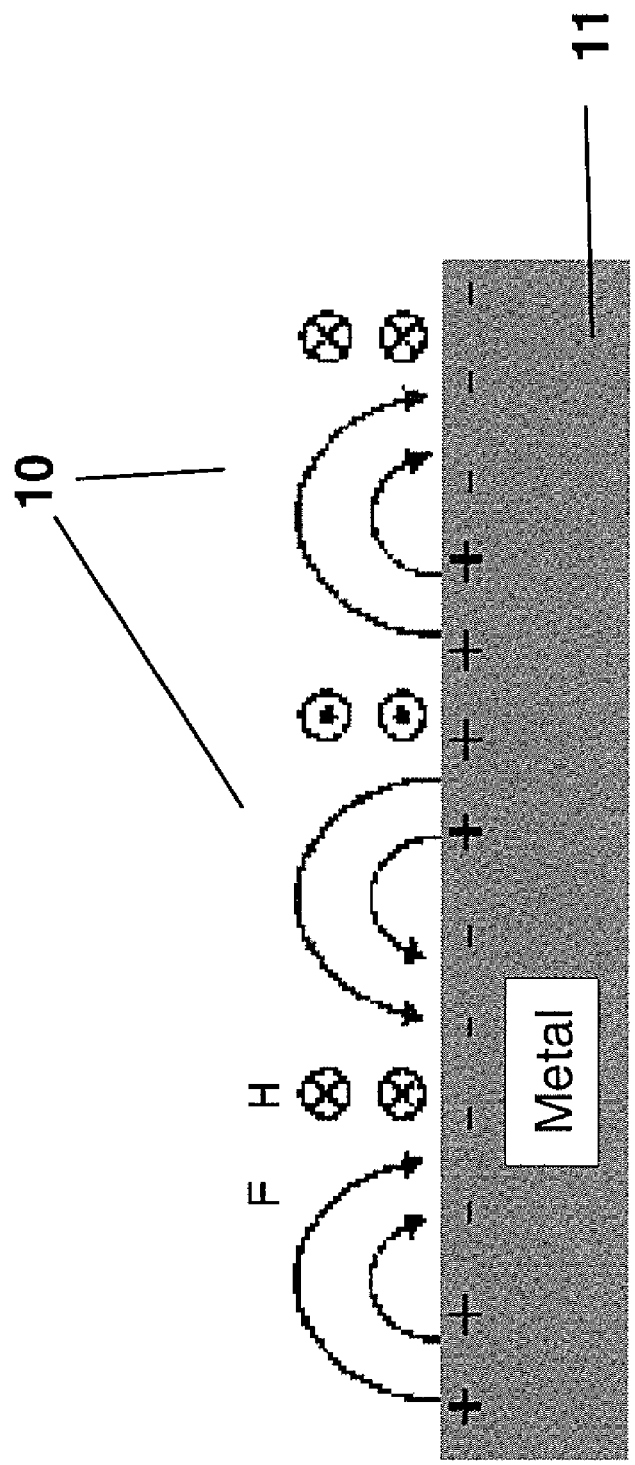
FIG. 1 depicts fields of a transverse magnetic surface wave on a flat metal surface.

FIG. 1 depicts a transverse magnetic (TM) surface wave 10 on a flat metal surface 11. A TM wave requires a surface with a surface impedance having an inductive term, while, in order to support a transverse electric (TE) surface wave, the reactive part of the surface impedance must be capacitive.

At optical frequencies, surface waves are known as surface plasmons. Surface waves are waves that are bound to the interface between a metal or other material and the surrounding space. The surface waves are characterized by longitudinally oscillating charges on the metal surface and associated fields in free space. On a flat metal surface, surface waves typically extend many thousands of wavelengths into the surrounding space. At low microwave frequencies, surface waves can extend many hundreds of meters into the surrounding space. Surfaces that allow surface waves to extend too far out into the surrounding space are not useful for wave guiding. Traditional techniques for creating surface wave media that confine fields closer to the surface generally involve thick dielectric coatings, which are not suitable for many military applications. Recent research has shown, however, that it is possible to produce thin, light-weight structures with textured-impedance surfaces that can have strong surface-wave guiding effects where the fields are confined close to the surface, do not readily leak power into free space, can follow curves in the surface, and have negligible propagation loss. Surface-wave medium, as used herein, refers to the specific embodiments in this specification or any surface capable of supporting surface waves.

Figure 2:
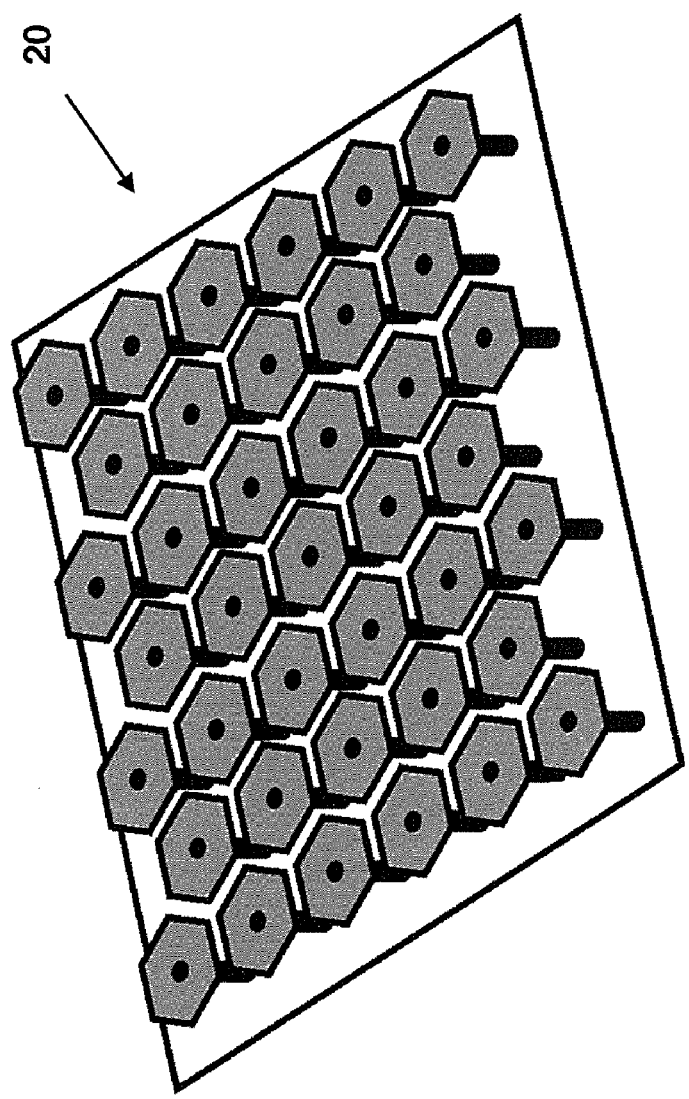
FIG. 2 depicts a periodic frequency-selective surface-wave guide having high impedance.
Figure 3:
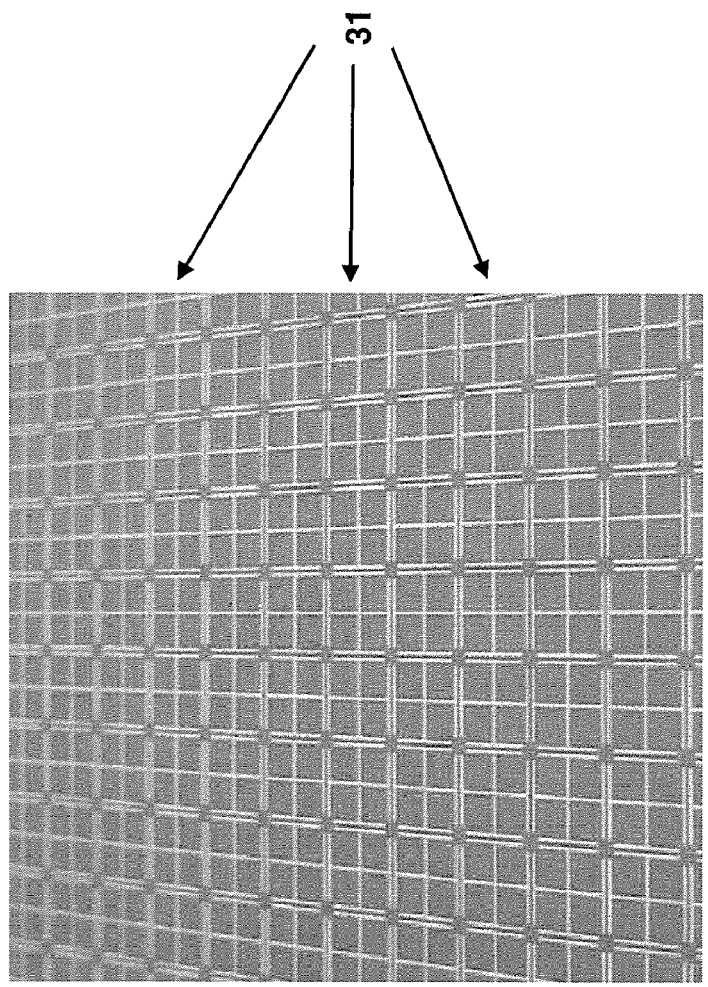
FIG. 3 depicts another periodic frequency-selective surface-wave guide having an array of Jerusalem Crosses.

FIG. 2 and FIG. 3 are two examples of textured-impedance surface geometries. A textured-impedance surface typically consists of a series of resonant structures tiled onto a thin flexible substrate. The complex geometry creates a medium that supports highly localized surface wave propagation by altering the surface impedance, such that the decay constant into free space is rapid, thus binding the wave to less than within a wavelength of the surface. A closely bound surface wave may be propagated along the surface with a small attenuation if the inductive reactance (i.e., reactive part of the surface impedance) is large and the resistance (i.e., real part of the surface impedance) is small. FIG. 2 depicts a two-layer high impedance surface-wave guide 20. FIG. 3 depicts a periodic frequency-selective surface-wave guide 30 having an array of Jerusalem Crosses 31. The surfaces depicted in FIG. 2 and FIG. 3 are inexpensive to manufacture and are readily integrated within structures.

Figure 4:
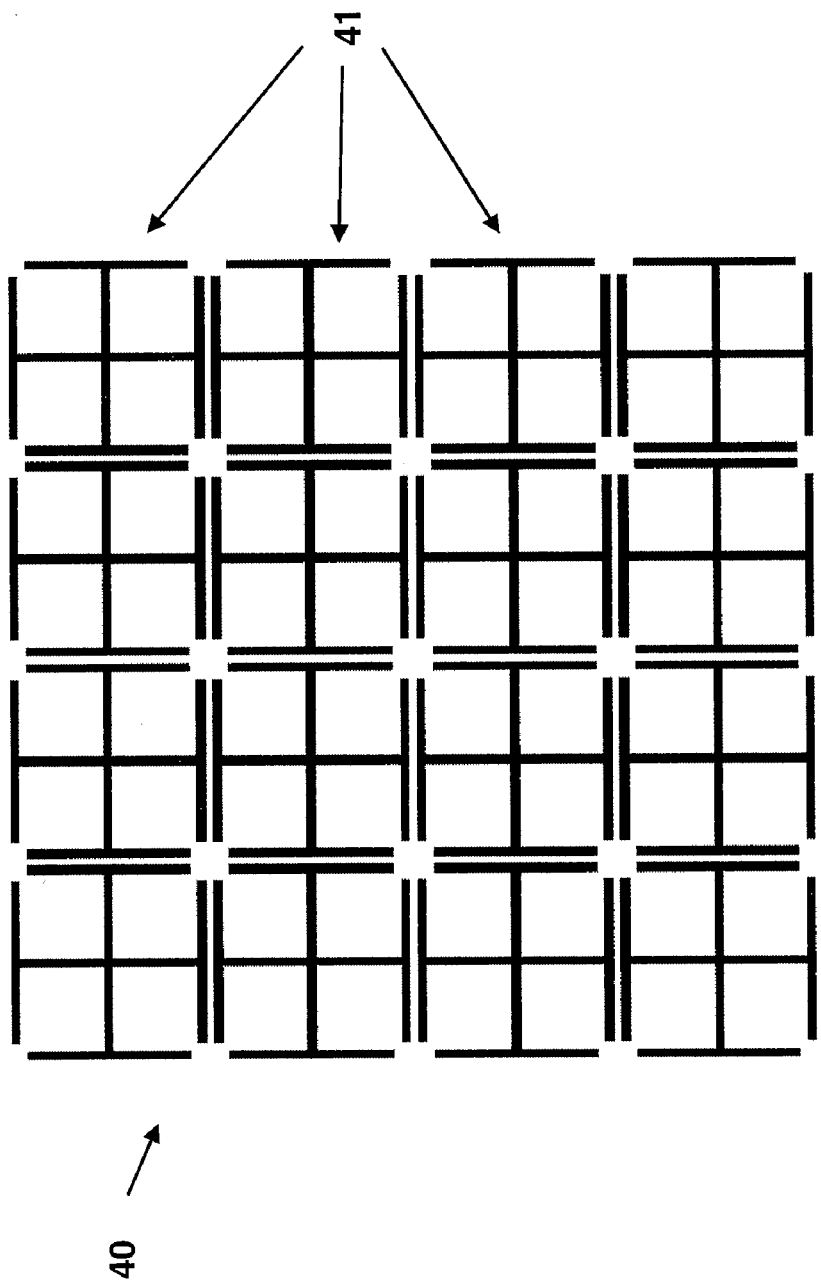
FIG. 4 is a schematic of an array of Jerusalem Crosses.
Figure 5:
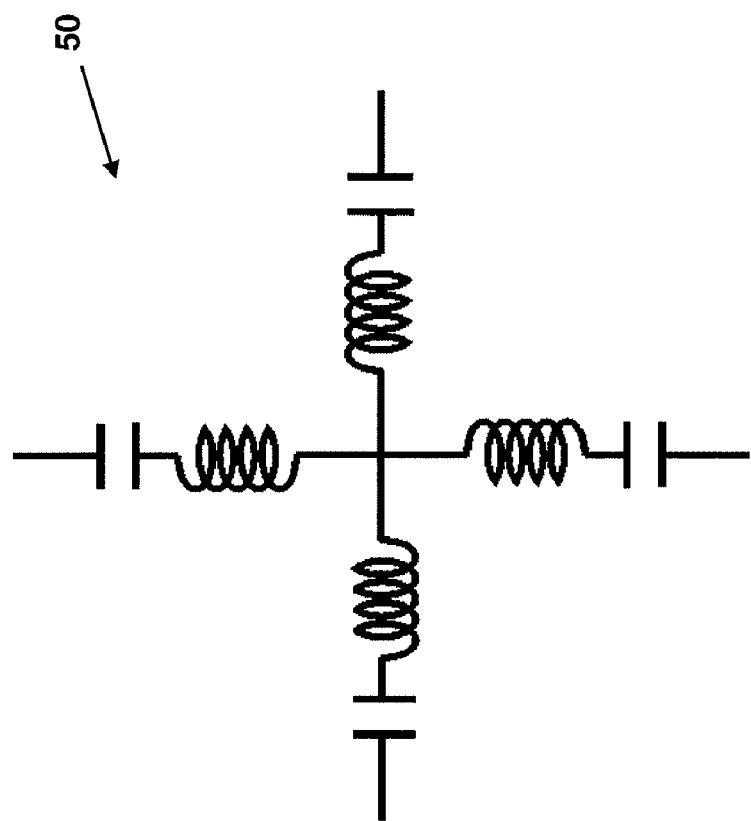
FIG. 5 is a circuit diagram depicting the equivalent circuit for the frequency selective surface-wave guide of FIG. 3.

FIG. 4 is a schematic of an array 40 of Jerusalem Crosses 41. FIG. 5 is a circuit diagram depicting the equivalent circuit for the frequency selective surface-wave guide 30 of FIG. 3.

Figure 6:
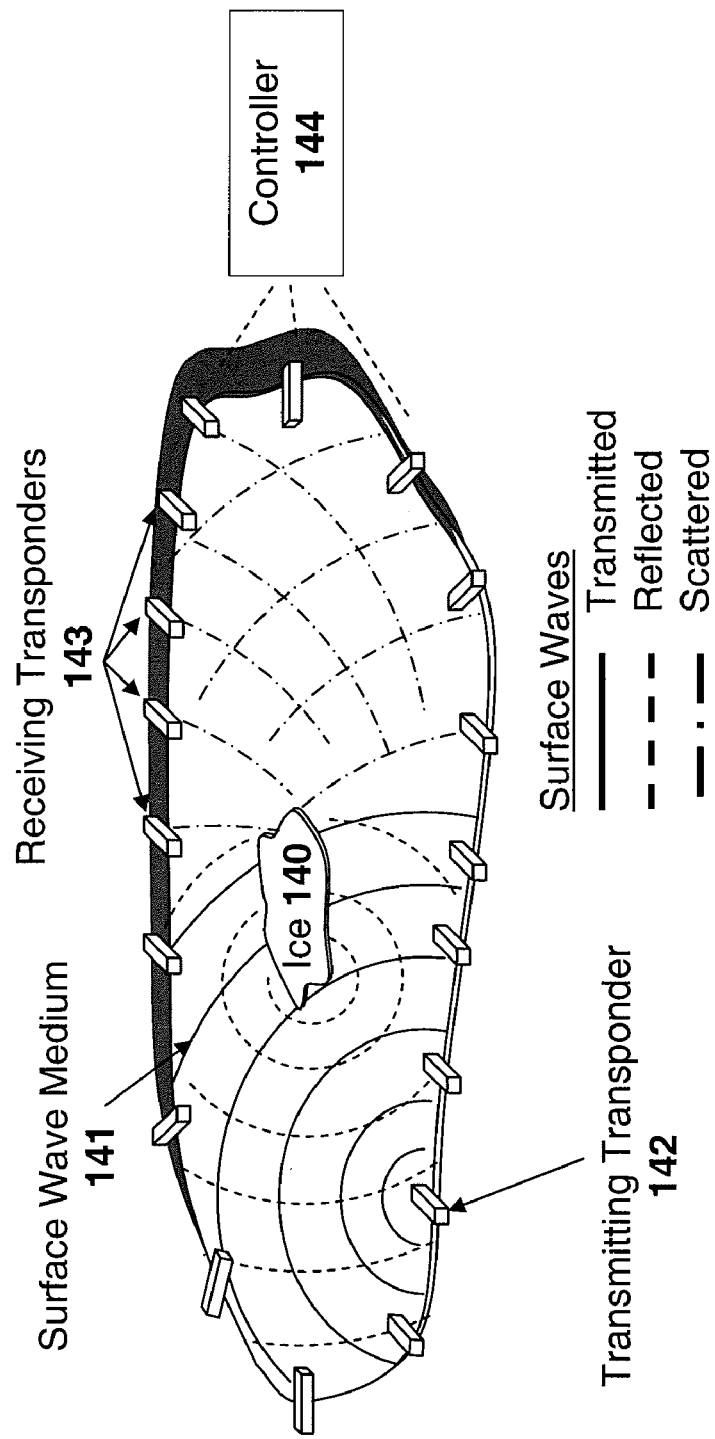
FIG. 6 is a diagram depicting ice detection with electromagnetic surface waves.
Figure 8:
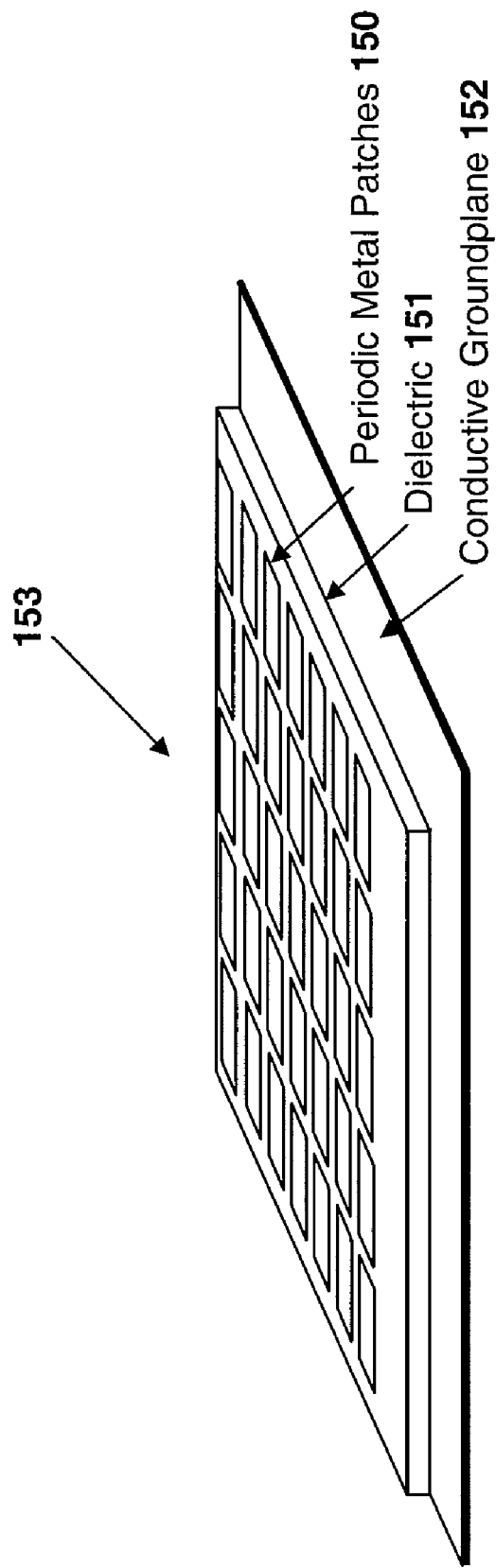
FIG. 8 depicts a surface-wave medium.

FIG. 6 is a diagram depicting ice detection with electromagnetic surface waves. FIG. 8 depicts a surface-wave medium. In an exemplary embodiment of the present invention, the system and method provide for remote monitoring of surface ice formation in real time. The system and method allows for rapid ice detection and appropriate de-icing action to take place before the ice becomes a problem. Such an ice detection system and method would be useful for aircraft, as the lift of an aircraft wing is decreased by ice formation. The effect is serious during flight, but more critical during take-off when engine thrust cannot compensate for the loss of lift because the engines are already operating at maximum thrust. Eight airline accidents since 1982 in which ice has been a factor have inspired new operating procedures such as application of SAE/ISO Type 1 de-icing and the newer Type 2 anti-icing fluid when possible icing conditions exist. It is clear that an ice thickness detector mounted on the wings of aircraft would be of benefit on take-off as well as in flight.

The method of remotely detecting ice formation on a surface includes launching an electromagnetic surface wave across a surface and mapping the propagation characteristics of the surface wave. When ice 140 forms on the surface, the propagation characteristics of a surface wave are altered in the area of the ice 140, and the location of the ice 140 may be detected in the surface wave propagation map.

As depicted in FIG. 6, the surface being monitored is treated with a lamination of a surface-wave medium 141, which is capable of supporting an electromagnetic surface wave whose fields are localized close to the surface. The surface under evaluation has several surface wave transponders 142, 143 located at its perimeter. A minimum of two transponders are required. The resolution of the surface imaging increases with the number of transponders. In an alternative embodiment, the surface-wave medium 141 is built into the surface rather than laminated to a top of a surface.

As depicted in FIG. 6, a thin layer of surface-wave medium 141 is laminated to the surface under evaluation. Typically, a surface wave medium can be realized by a reactive impedance surface. Reactive impedance surfaces can be formed by laminating textured metallic patterns to an insulating dielectric 151 on top of a metallic ground plane 152. The surface impedance is determined by the size and spacing of the metal patches and the thickness of the dielectric 151 and its electrical properties, such as its permittivity, resistivity, and permeability.

Figure 7:
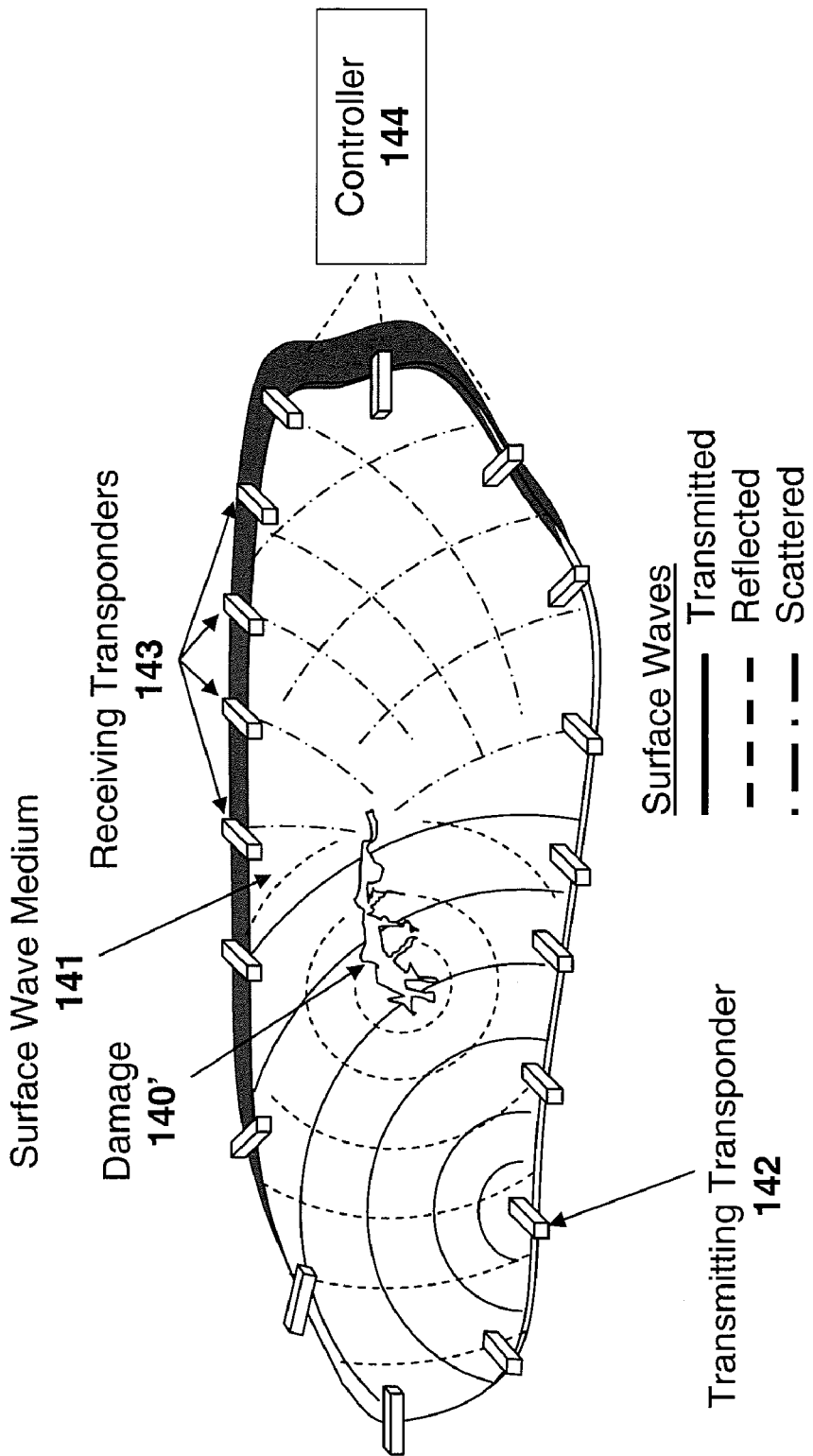
FIG. 7 is a diagram depicting damage detection with electromagnetic surface waves.

FIG. 7 is a diagram depicting damage detection with electromagnetic surface waves. According to an exemplary embodiment of the present invention, a surface can be remotely monitored in real time for damage 140', such as strains, deformations, holes, tears, or bends. The system and method allows for rapid evaluation of compromising situations and enables appropriate action or repairs to take place before greater damage occurs. Such a system and method could be useful for aircraft integrated vehicular health management (IVHM). For example, the system and method could be used to detect cracks and strains in aircraft control surfaces. Many IVHM systems use sensors and intelligent prognostication software to identify crisis situations before they happen. Typically, the more sensors available, the more likely a compromising situation can be averted. The exemplary embodiment improves on IVHM systems by not only being able to identify structural compromise, but also being able to identify an exact location of the damage. The exemplary embodiment could also be integrated within a current IVHM system as a combined sensor. Such a system and method would be an integral part of its platform and operate in real time without interfering with a vehicle's primary operation.

In an exemplary embodiment, the system and method launches an electromagnetic surface wave across a surface and maps the propagation characteristics of the surface wave in order to remotely detect damage to a surface. When damage occurs, in the form of a puncture, tear, bend, or strain, the propagation characteristics of a surface wave are altered in the area of the damage and may be detected in the surface-wave map.

As depicted in FIG. 7, the surface being monitored is treated with a lamination of a surface-wave medium 141, capable of supporting an electromagnetic surface wave whose fields are localized close to the surface. The surface under evaluation has several surface wave transponders 142, 143 located at its perimeter. A minimum of two transponders are required. The resolution of the surface imaging increases with the number of transponders.

A thin layer of surface-wave medium 141 is laminated to the surface under evaluation. Typically, a surface-wave medium 141 can be realized by a reactive impedance surface. Reactive impedance surfaces can be formed by laminating textured metallic patterns to an insulating dielectric 151 on top of a metallic ground plane 152. The surface impedance is determined by the size and spacing of the metal patches and the thickness of the dielectric 151 and its electrical properties, such as its permittivity, resistivity, and permeability.

As depicted in FIG. 8, the simplest pattern is a periodic arrangement of metallic squares 150. The size of the squares 150 and their spacing determines the magnitude of surface's reactive impedance. The magnitude of the impedance determines how tightly a surface wave is bound to the surface-wave medium 153. The surface-wave medium's reactive impedance, and therefore its surface-wave properties, is frequency dependent.

The surface-wave medium 153 can be designed to support any frequency of electromagnetic radiation. However, the microwave range of 1 GHz to 100 GHz, especially 2 GHz-20 GHz, is most convenient for easily fabricating applicable surface-wave mediums. Surface-wave mediums in this frequency range can be 0.100" to 0.005" thick and can be fabricated with conventional, commercially available dielectric materials 151 and metallic printing processes.

The ice formation 140 or damage 140' is imaged by having each of the surface wave transponders 142 transmit an electromagnetic pulse that propagates along the surface and is measured by the other transponders 143 for time of flight, phase difference, and amplitude. Any ice 140 on the surface or damage 140' to the surface will modify the transmitted surface-wave propagation by reflecting, diffracting, and scattering the surface wave. The signals measured at each transponder 143 are the combination of the transmitted, reflected, and scattered waves, and its amplitude and phase characteristics are dependent on the geometry of the ice formation. Each transponder 142 transmits an electromagnetic pulse that is measured by all of the other transponders 143. If there are N transponders, then there are N(N+1)/2 unique signals that are detected and analyzed for the image of the ice/damage. The measured signals are analyzed and compared to the baseline ice-free/damage-free signals by the controller 144 to create an image of ice formation on the surface or damage to the surface.

The preceding paragraphs describe structures for implementing a surface-wave medium. However, a person skilled in the art will realize a surface-wave medium may be constructed in other ways now known or in others ways yet to be developed. Consequently, a surface-wave medium should be interpreted as any surface capable of supporting surface waves, unless otherwise limited.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of detecting a surface characteristic of a surface configured to propagate surface waves, comprising:
   transmitting electromagnetic surface waves onto the surface,
   wherein a surface-wave medium is laminated to the surface, and the surface-wave medium includes a dielectric and a metallic pattern on the dielectric for increasing an inductive reactance of the surface-wave medium;
   receiving the electromagnetic surface waves upon being reflected, diffracted, refracted, scattered, or otherwise altered by the surface characteristic of the surface; and
   coordinating the transmitting and the receiving of the electromagnetic surfaces waves for imaging the surface characteristic of the surface, wherein the surface characteristic comprises ice, the method further comprising analyzing the received electromagnetic surface waves and comparing the received electromagnetic surface waves to baseline signals from an ice-free surface for imaging the ice on the surface.

2. The method as claimed in claim 1, further comprising: transmitting the electromagnetic surface waves from a plurality of transmitters located at a perimeter of the surface and receiving the electromagnetic surface waves by the plurality of transmitters.

3. The method as claimed in claim 2, wherein the plurality of transmitters are coordinated to transmit and to receive the electromagnetic surface waves for imaging the surface characteristic of the surface.

4. The method as claimed in claim 1, wherein the surface-wave medium includes a conductive ground plane between the surface and the dielectric.

5. The method as claimed in claim 1, wherein the metallic pattern is aperiodic.

6. The method as claimed in claim 1, wherein the metallic pattern is a periodic metallic pattern of squares, rectangles, parallel or perpendicular hash marks, or Jerusalem crosses.

7. The method as claimed in claim 1, wherein the surface characteristic further comprises damage, the method further comprising analyzing the received electromagnetic surface waves and comparing the received electromagnetic surface waves to baseline signals from a damage-free surface for imaging the damage to the surface.

8. A method of forming a surface characteristic detection system on a surface, comprising:
  laminating a surface-wave medium to the surface, the surface-wave medium including a dielectric and a metallic pattern on the dielectric for increasing an inductive reactance of the surface-wave medium;
  locating a plurality of transponders on the surface for transmitting electromagnetic surface waves and for receiving the electromagnetic surface waves upon being reflected, diffracted, refracted, scattered, or otherwise altered by the surface characteristic of the surface; and
  coupling the plurality of transponders to a controller, the controller being adapted to coordinate the plurality of transponders for imaging the surface characteristic of the surface; and
  wherein the surface characteristic comprises ice on the surface.

9. The method as claimed in claim 8, further comprising: locating the plurality of transponders at a perimeter of the surface.

10. The method as claimed in claim 8, wherein the surface-wave medium includes a conductive ground plane between the surface and the dielectric.

11. The method as claimed in claim 8, wherein the metallic pattern is aperiodic.

12. The method as claimed in claim 8, wherein the metallic pattern is a periodic metallic pattern of squares, rectangles, parallel or perpendicular hash marks, or Jerusalem crosses.

13. The method as claimed in claim 8, wherein the surface characteristic further comprises damage to the surface.

14. A method of forming a surface characteristic detection system on a surface, comprising:
  laminating a surface-wave medium to the surface, the surface-wave medium including a conductive ground plane, a dielectric on the ground plane, and a metallic pattern on the dielectric for increasing an inductive reactance of the surface-wave medium;
  locating a plurality of transponders at a perimeter of the surface for transmitting electromagnetic surface waves and for receiving the electromagnetic surface waves upon being reflected, diffracted, refracted, scattered, or otherwise altered by ice on the surface; and
  coupling the plurality of transponders to a controller, the controller being adapted to coordinate the plurality of transponders for imaging the surface characteristic of the surface, the surface characteristic being one selected from the group consisting of ice on the surface or damage to the surface.

15. A system for detecting a surface characteristic of a surface, comprising:
  a plurality of transponders on the surface for transmitting electromagnetic surface waves and for receiving the electromagnetic surface waves upon being reflected, diffracted, refracted, scattered, or otherwise altered by the surface characteristic of the surface;
  a surface-wave medium laminated to the surface, the surface-wave medium including a dielectric and a metallic pattern on the dielectric for increasing an inductive reactance of the surface-wave medium; and
  a controller coupled to the plurality of transponders, the controller being adapted to coordinate the plurality of transponders for imaging the surface characteristic of the surface;
  wherein the surface characteristic comprises ice, and the controller is further adapted to analyze the received electromagnetic surface waves and to compare the received electromagnetic surface waves to baseline signals from an ice-free surface for imaging the ice on the surface.

16. The system as claimed in claim 15, wherein the plurality of transponders are located at a perimeter of the surface.

17. The system as claimed in claim 15, wherein the surface-wave medium includes a conductive ground plane between the surface and the dielectric.

18. The system as claimed in claim 15, wherein the metallic pattern is aperiodic.

19. The system as claimed in claim 15, wherein the metallic pattern is a periodic metallic pattern of squares, rectangles, parallel or perpendicular hash marks, or Jerusalem crosses.

20. The system as claimed in claim 15, wherein the surface characteristic further comprises damage and the controller is further adapted to analyze the received electromagnetic surface waves and to compare the received electromagnetic surface waves to baseline signals from a damage-free surface for imaging the damage to the surface.

21. A system for detecting ice on a surface or damage to the surface, comprising:
  a surface-wave medium laminated to the surface, the surface-wave medium including a conductive ground plane, a dielectric on the ground plane, and a metallic pattern on the dielectric for increasing an inductive reactance of the surface-wave medium;
  a plurality of transponders located at a perimeter of the surface for transmitting electromagnetic surface waves and for receiving the electromagnetic surface waves upon being reflected, diffracted, refracted, scattered, or otherwise altered by ice on the surface; and
  a controller coupled to the plurality of transponders, the controller being adapted to coordinate the plurality of transponders, to analyze the received electromagnetic surface waves, and to compare the received electromagnetic surface waves to baseline signals from an ice-free surface for imaging the ice on the surface or from a damage-free surface for imaging the damage to the surface.

* * * * *